United States Patent [19]

Shopp

[11] Patent Number: 5,341,241
[45] Date of Patent: Aug. 23, 1994

[54] TRAP DOOR FOR PROJECTION SCREEN CASE

[75] Inventor: Rick A. Shopp, Spiceland, Ind.

[73] Assignee: Draper Shade & Screen Co., Inc., Spiceland, Ind.

[21] Appl. No.: 67,541

[22] Filed: May 26, 1993

[51] Int. Cl.⁵ ............................................. G03B 21/56
[52] U.S. Cl. ................................ 359/443; 359/461
[58] Field of Search ................................ 359/461, 443

[56] References Cited

U.S. PATENT DOCUMENTS

| | | | |
|---|---|---|---|
| 4,072,404 | 2/1978 | Brown | 350/117 |
| 4,180,183 | 12/1979 | Muller | 221/194 |
| 4,373,289 | 2/1983 | Douglas et al. | 46/1 R |
| 4,727,919 | 3/1988 | Kraeutler | 160/84 R |
| 4,748,766 | 6/1988 | Stimac | 43/69 |
| 4,768,525 | 9/1988 | Tanis | 130/27 |

Primary Examiner—Monroe H. Hayes
Attorney, Agent, or Firm—Baker & Daniels

[57] ABSTRACT

An electrically actuated trap door system for a projection screen case. The system includes a trap door having first and second opposing edges. The first edge of the trap door is pivotally connected to the case such that the trap door is movable between a closed position in which the trap door is substantially flush with the bottom surface of the case and an open position in which the second edge of the trap door is disposed within the interior of the housing to form an opening in the bottom surface of the case. A motorized roller rotatable in first and second directions about its longitudinal axis is disposed within the case, and a ribbon connects the trap door and the roller to translate the rotation of the roller into movement of the trap door between its closed position and its open position.

21 Claims, 4 Drawing Sheets

TRAP DOOR FOR PROJECTION SCREEN CASE

FIELD OF THE INVENTION

This invention relates to electrically powered projection screens, and, in particular, to an electrically actuated trap door for a case housing the operable components of the projection screen.

BACKGROUND OF THE INVENTION

The use of electrically powered projection screens has become quite popular in conference rooms, board rooms and the like. With the touch of a button, the screen may be lowered for use or retracted into its case after use for storage. In some instances, the surface of the case through which the screen extends includes a trap door. When closed, the trap door provides an aesthetically pleasing appearance as the surface through which the screen extends appears to be continuous rather than having a large open slot therein to permit movement of the lower edge of the screen, which usually includes a weight or a dowel across the width of the screen, through the case. Such trap doors also protect the operable components (motor, roller, etc.) which are housed within the case.

In general, trap doors for the cases of electrically powered projections screens are also electrically actuated. The reversible motor used for rolling and unrolling the projection screen or a separate reversible motor is coupled to the trap door such that activation of a motor causes the trap door to move between its open and closed positions. When open, the trap door is pivoted downward away from the interior of the case.

Several improvements to such a trap door system are desirable. First, with regard to the aesthetic appearance of the projection screen case, trap doors of the prior art open away from the case and intrude into the room. Also, these trap doors usually pivot about a hinge located on the exterior of the bottom of the case thereby detracting from the case's appearance when the door is in its closed position. Not only does the exterior hinge of prior art trap doors detract from the aesthetic appearance of the case, the hinge is susceptible to becoming bound or interfered with should the case be painted, for example. Therefore, it is desirable to provide an aesthetically pleasing trap door for a projection screen case which opens into the case to avoid intruding into the room, and to provide a trap door having no exterior hinges to result in a trap door which is flush with the exterior of the case when in its closed position and to avoid the potential problems of the hinge becoming bound or interfered with to hinder the operation of the trap door.

When the trap door of the prior art is in its closed position, one edge of the door is suspended by an exterior hinge and the other edge is only supported by the mechanism connecting the door to its driving motor. Thus, when in its closed position, the trap door may become misaligned or warped. It is therefore desired to provide a trap door which is supported at both of its edges when the door is in its closed position to inhibit potential misalignment or warpage of the trap door.

Some electrically actuated trap doors of the prior art are rigidly affixed to the motor which moves the trap door between its open and closed positions while other electrically actuated trap doors pull the trap door closed and allow the trap door to drop open. In either case, if the driving motor is not functioning properly or if power to the driving motor is unavailable, access to the interior of the case is not possible without disassembling the case. Because projection screen cases are usually assembled using multiple fasteners, disassembly is a time consuming task which results in unwanted delays if the motor driving the trap door is to be replaced or repaired. Further, access to the interior of the case for repair or maintenance of any component therein is essentially denied as the trap door is only open when the screen extends through the case. Therefore, it is desirable to provide an electrically actuated trap door for a projection screen case which allows access to the interior of the case without the provision of power to the trap door's electrically actuating mechanisms.

As previously stated, trap doors of the prior art are essentially rigidly affixed to the door's driving motor for the purpose of closing the trap door, and in some cases for the purposes of opening of the trap door. As a result, when the door moves from its open position to its closed position, the door exerts a great deal of torque. Therefore, in the event an obstruction is placed in the path of the trap door as the trap door moves from its open to its closed position, either the obstruction itself will be damaged or undue stress to the door's driving motor caused by the presence of the obstruction will likely result in damage to the motor. For example, if an individual inadvertently places a finger in the path of the closing door, it is likely that the finger will be pinched or even broken due to the high torque generated by the driving motor. A solid, inflexible obstruction which does not yield to the force exerted thereon by the trap door may, on the other hand, result in damage to the motor or another component of the trap door mechanism. Therefore, it is desirable to provide an electrically actuated trap door which, when closing in the presence of an obstruction in the door's path, does not harm the obstruction or result in damage to the door's driving motor.

SUMMARY OF THE INVENTION

The present invention provides an electrically actuated trap door system for a projection screen case having a bottom surface and defining an interior space.

The invention comprises, in one form thereof, a trap door having first and second opposing edges. The first edge of the trap door is pivotally connected to the case such that trap door is movable between a closed position in which the trap door is substantially flush with the bottom surface of the case and an open position in which the second edge of the trap door is disposed within the interior of the case. The system also includes a pivoting mechanism disposed within the case for pivoting the trap door between its open and closed positions. The pivoting mechanism is connected to the trap door such that activation of the mechanism causes the trap door to pivot about its first edge toward its open position, and deactivation of the pivoting mechanism allows the trap door to move toward its closed position by gravitational forces.

In one form thereof, the pivoting mechanism comprises a motorized roller, an interconnecting mechanism, and a driving motor for driving the roller. The motorized roller has a longitudinal axis and is rotatable in first and second directions about its longitudinal axis. The interconnecting mechanism is connected to the roller and the trap door for translating the rotation of the roller into movement of the trap door between its closed position and its open position.

In one embodiment, the interconnecting mechanism comprises a ribbon having two ends and the directing mechanism comprises a reversible motor connected to the roller. One end of the ribbon is connected to the trap door and the other end of the ribbon is connected to the roller such that rotation of the roller in the first direction as directed by the motor causes the ribbon to wrap around thereby moving the trap door toward its open position, and rotation of the roller in the second direction as directed by the roller causes the ribbon to unwind from around the roller such that gravitational forces move the trap door toward its closed position.

Accordingly, one advantage of the present invention is the provision of a trap door for a projection screen case which is aesthetically pleasing, inexpensive to manufacture, and reliable.

Another advantage of the present invention is the provision of a trap door for a projection screen case which does not utilize an exterior hinge at one edge of the door and which is supported at both edges when the door is in its closed position.

Still another advantage of the present invention is the provision of a trap door for a projection screen case which is permitted to be closed by the force of gravity.

Yet another advantage of the present invention is the provision of an electrically actuated trap door for a projection screen case which may be opened to provide access to the inside of the case without requiring electrical power.

Another advantage of the present invention is the provision of a trap door for a projection screen case which is flush with the bottom surface of the projection screen when the door is in its closed position Still another advantage of the present invention is the provision of an electrically actuated trap door for a projection screen case which, when closing with an obstruction present in the path of the trap door, does not result in damage to the motor of the closing mechanism nor does it result in harm or damage to the obstruction.

Yet another advantage of the present invention is the provision of a trap door which does not intrude into the room when in its open position.

BRIEF DESCRIPTION OF THE DRAWINGS

The above-mentioned and other features and advantages of this invention, and the manner of attaining them, will become more apparent and the invention will be better understood by reference to the following description of the embodiments of the invention taken in conjunction with the accompanying drawings, wherein.

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION

Figure 1:
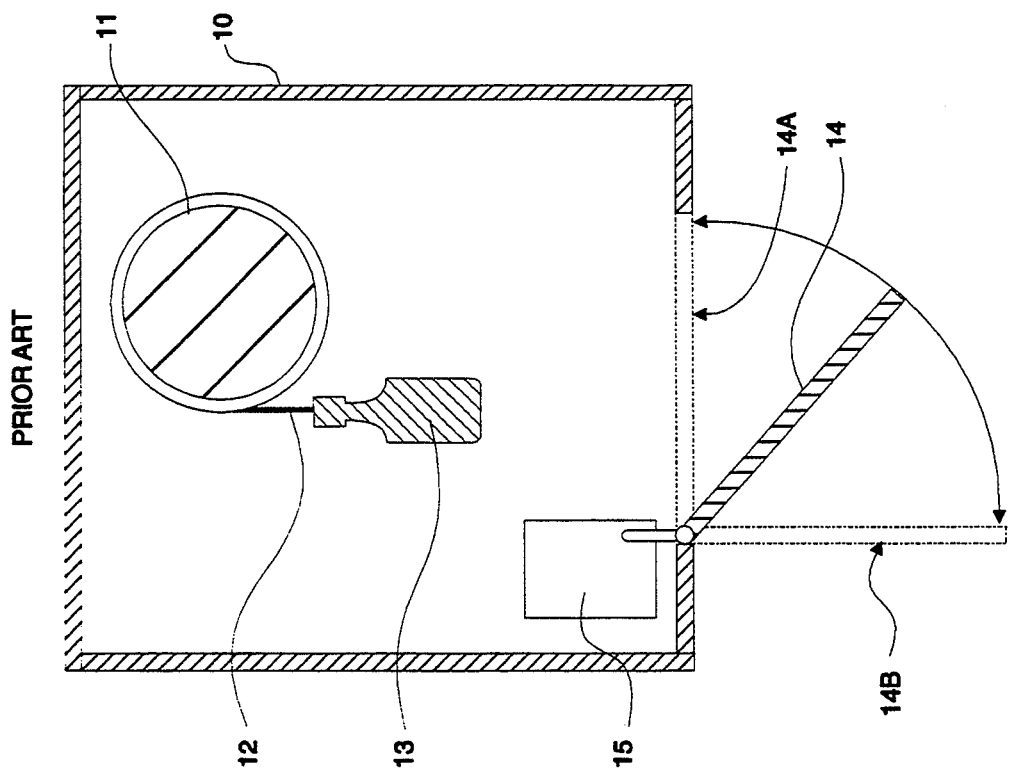
FIG. 1 shows a cross-sectional view of an electrically actuated trap door for a projection screen which constitutes prior art.

Referring now to FIG. 1, there is shown a cross-sectional view of an electrically actuated trap door for a projection screen case known in the art. For aesthetic reasons and to protect the inner workings of a motorized projection screen, trap doors are often provided on the bottom of the casing in which the projection screen resides. These trap doors are typically motorized and open downwardly in the manner illustrated in FIG. 1. A motorized roller 11 resides within case 10. Screen surface 12 is wound around roller 11 and weight 13 extends from the lower edge of screen 12. Either the motor powering roller 11 or a separate motor, illustrated here as second motor 15, is directly coupled to trap door 14 such that activation of such motor causes trap door 14 to move between its closed and open positions, 14A and 14B, respectively.

As previously discussed, there are several disadvantages to trap doors of the type illustrated in FIG. 1. Because second motor 15 is fixably coupled with trap door 14, motor 15 must be operational to provide access to the inside of case 10 as may be required for repair or maintenance of components with case 10. Therefore, in the event that second motor 15 is inoperable or power is unavailable to second motor 15, an individual must disassemble the case to make repairs or to perform maintenance on the operable components housed in case 10. Further, it is possible that an individual may inadvertently have their fingers pinched or even broken if trap door 14 is in the process of moving between its open position 14B and its closed position 14A and fingers are caught between trap door 14 and case 10. If an obstruction of sufficient rigidity lies in the path of trap door 14 upon closing, motor 15 could be damaged by attempting to operate in the presence of such an obstruction.

Figure 2:
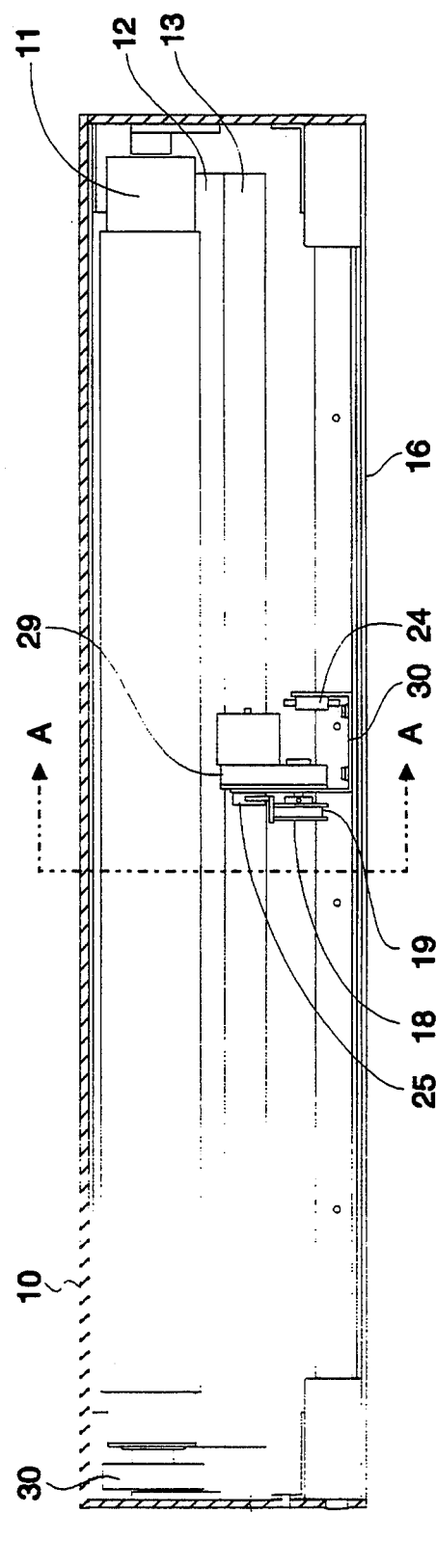
FIG. 2 shows a longitudinal cross-sectional view of one embodiment of a projection screen case of the present invention in which the trap door is closed.

FIG. 2 shows a longitudinal cross-sectional view of one embodiment of a projection screen of the present invention in which the trap door is closed. Projection screen case 10 includes bottom surface 16 and defines interior space 17 of case 10. Within interior 17 of case 10 resides first motorized roller 11 about which projection screen 12, having weight 13 attached thereto, is rolled and unrolled. Attached to bottom surface 16 of case 10 is motor bracket 30 to which second motorized roller 18 and reversible motor 29 are attached. Reversible motor 29 is used to direct the rotation of second motorized roller 18 as is described in further detail herein. The trap door of the present invention is coupled via nylon ribbon 19 (see FIG. 3) to second motorized roller 18. In this embodiment, second motorized roller 18 is located approximately in the center of the longitudinal axis, or width, of case 10.

Figure 4:
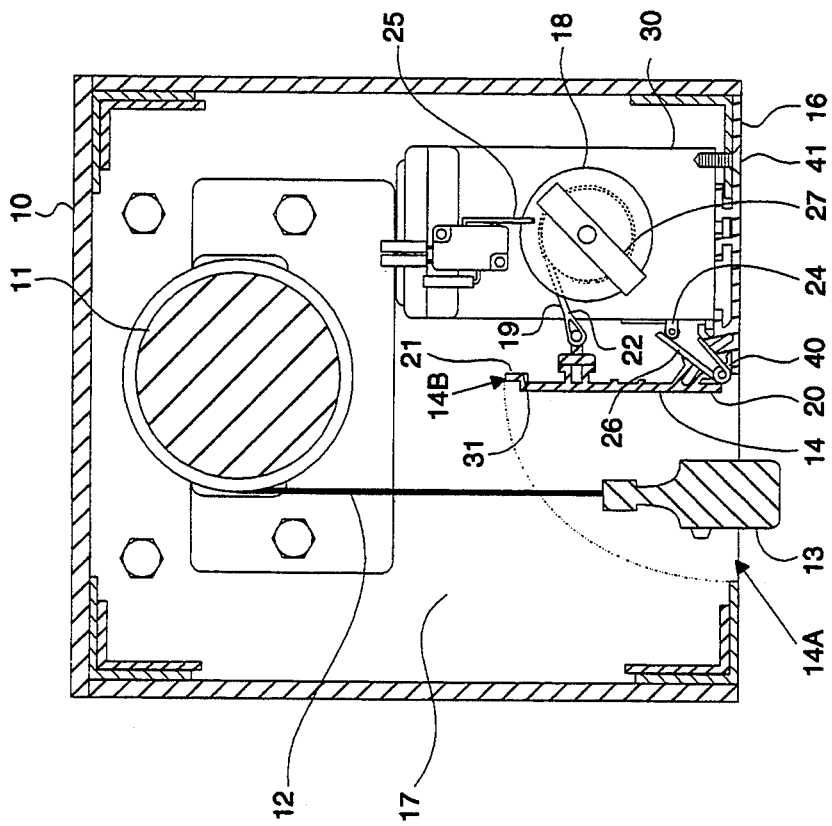
FIG. 4 shows a cross-sectional view of the embodiment the trap door of FIG. 2 at line A—A in which the trap door is in its open position.
Figure 3:
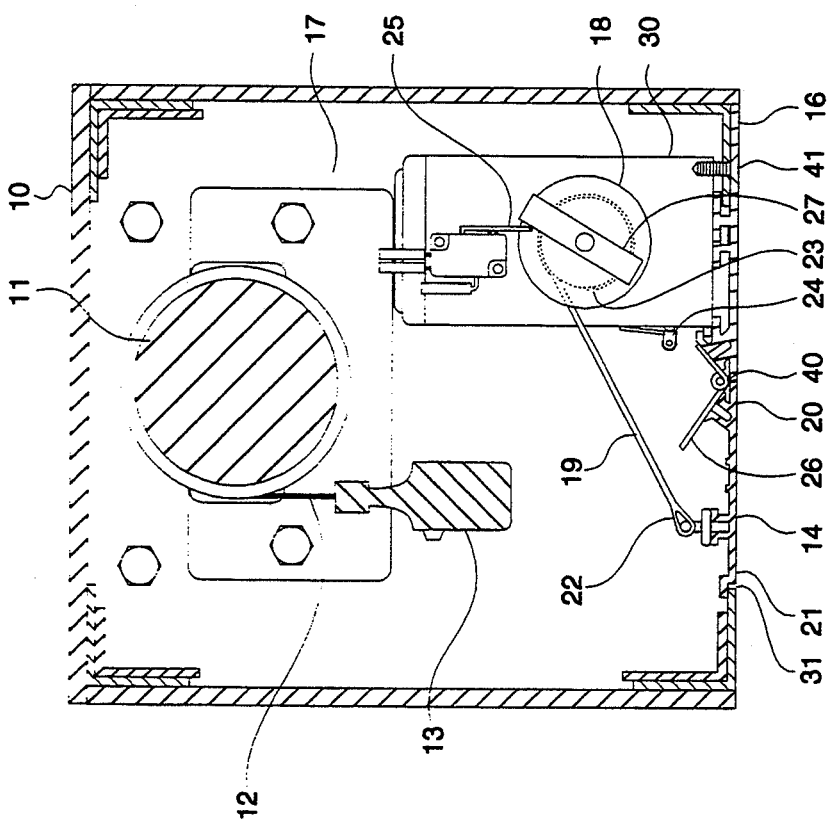
FIG. 3 shows a cross-sectional view of the embodiment of the trap door of FIG. 2 at line A—A in which the trap door is in its closed position.

Referring now to FIG. 3, there is shown a cross-sectional view of the embodiment of trap door of FIG. 2 at line A—A in which the trap door is in its closed position. In this embodiment, trap door 14 is substantially flush with bottom surface 16 of case 10. Trap door 14 has first and second opposing edges 20 and 21, respectively. First opposing edge 20 of trap door 14 is pivotally connected to case 10 via hinge 40. Hinge 40 is positioned within case 10. Also positioned within case 10 is second motorized roller 18 about which nylon ribbon 19 is rolled. Specifically, first end 22 of nylon ribbon 19 is connected to trap door 14 and second end 23 of nylon ribbon 19 is connected to second motorized roller 18 which, in this embodiment, is driven by reversible motor 29 (see FIG. 2). Provision of power to reversible motor 29 and hence to second motorized roller 18 causes second motorized roller 18 to move in one of its two opposing directions about its longitudinal axis which is parallel to the longitudinal axis of case 10. The direction of rotation of second motorized roller 18 is determined by reversible motor 29. Thus, when second roller 18 is activated to rotate in the clockwise direction as viewed from FIG. 3, nylon ribbon 19 is further rolled about second roller 18 to pivot trap door 14 via hinge 40 to its open position. This arrangement is illustrated in FIG. 4, wherein second edge 21 of trap door 14 resides within interior 17 of case 10. Because trap door 14 is pivoted about hinge 40, first end 22 of nylon ribbon 19 must be positioned a sufficient distance away from first edge 20 of trap door 14 toward second edge 21 of trap door 14 to result in the pivotal motion of trap door 14.

In this embodiment, the trap door system also includes first and second limit switches 24 and 25, respectively, which are attached to motor bracket 30 as shown in FIG. 2. First and second limit switches 24 and 25 are electrically connected to second motorized roller 18 such that when either first or second limit switch 24 or 25 is actuated, power to second motorized roller 18 is disconnected. First limit switch 24 is actuated by plate 26 disposed at first edge 20 of trap door 14 within case 10. Second limit switch 25 is actuated by slat 27 fixably attached to second motorized roller 18.

To open trap door 14, i.e., to move trap door 14 from its closed position illustrated in FIG. 3 to its open position illustrated in FIG. 4, second motorized roller 18 is activated to rotate in a clockwise direction. The clockwise rotation of second motorized roller 18 causes ribbon 19 to be wound about second motorized roller 18 and trap door 14 to pivot about hinge 40 until plate 26 engages and activates first limit switch 24. When first limit switch 24 is activated, trap door 14 has reached its open position whereupon power to second motorized roller 18 is disconnected. Trap door 14 is maintained in the open position shown in FIG. 4 by a taut connection between trap door 14 and second motorized roller 18 via ribbon 19.

To move trap door 14 from its open position shown in FIG. 4 to its closed position shown in FIG. 3, second motorized roller 18 is caused to rotate in a counterclockwise direction. The counterclockwise rotation of second motorized roller 18 provides slack in ribbon 19 such that the taut connection described above is released, and the force of gravity moves trap door 14 toward its closed position. In this embodiment, second motorized roller 18 continues to rotate in the counterclockwise direction until slat 27 engages and activates second limit switch 25 at which point trap door 14 has reached its closed position and power to second motorized roller 18 may be disconnected.

The trap door system of the present invention allows one to access the interior of case 10 when trap door 14 is in its closed position by simply pushing trap door 14 at a point some distance from first edge 20 of trap door 14 so that trap door 14 pivots about hinge 40 into case 10 toward open position. In fact, access may be gained to the interior of case 10 without the use of tools, even if the motors fail to operate.

The trap door of the present invention does not intrude into the room as trap door 14 pivots inside case 10 rather than outside case 10. Also, no exterior hinges are used to support trap door 14. When trap door 14 is in its closed position, trap door 14 is supported at first opposing edge 20 by hinge 40. Formed on second edge 21, of trap door 14 is lip 31 which rests on bottom surface 16 of case 10 such that trap door 14 is flush with and supported by bottom surface 16 of case 10. This support arrangement reduces the likelihood that trap door 14 will become misaligned or warped or that the operation of trap door 14 will be inhibited by painting bottom surface 16 of case 10 and/or trap door 14. Also, when trap door 14 is in its closed position, the appearance of the bottom of case 10 and trap door 14 is aesthetically pleasing.

The trap door system of the present invention is less likely to cause harm or be harmed by the presence of an obstruction in its path during the process of closing the trap door when compared to prior art designs. Specifically, because trap door 14 of the present invention is not fixably coupled with second motorized roller 18, should an obstruction be present when either trap door 14 is closed, trap door 14 would simply rest on top of that obstruction and would not exert any forces other than the weight of trap door 14 on the obstruction. Thus, no damage to the obstruction results and no counter forces by the obstruction on the trap door system exist to cause damage to the trap door system.

Figure 5:
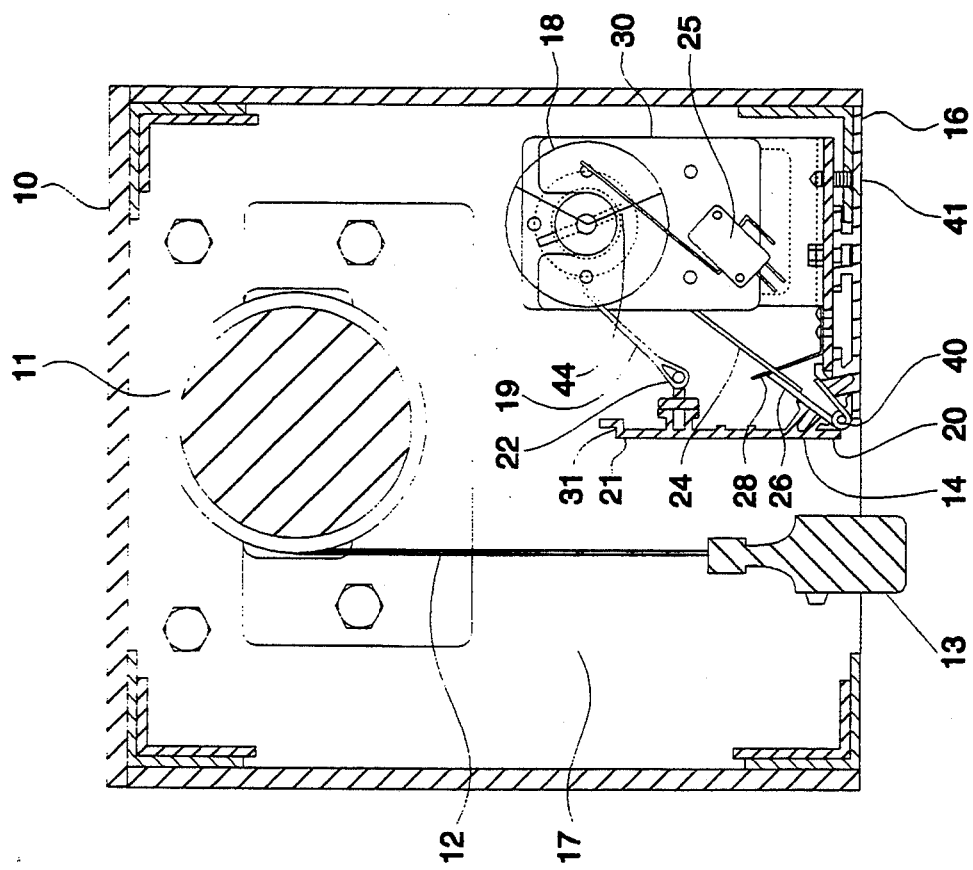
FIG. 5 shows a cross-sectional view of a second embodiment of the trap door according to the present invention.

Referring now to FIG. 5, there is shown a cross-sectional view of a second embodiment of the trap door according to the present invention. In this embodiment, second motorized roller 18 is disposed above second limit switch 25 and has actuating screw 44 attached thereto such that when trap door 14 is moved from its open position to its closed position via counter clockwise rotation of second motorized roller 18, actuating screw 44 engages and activates second limit switch 25 when trap door 14 reaches its closed position. The combination of motorized roller 18, actuating screw 44 and second limit switch 25 in the embodiment of FIG. 5 achieves the same result as second motorized roller 18, slat 27 and second limit switch 25. Thus, the position of these elements is not critical to the scope and operation of the present invention.

In the embodiment of FIG. 5, spring clip 28 is disposed within interior 17 of case 10 and, more specifically, is affixed to motor bracket 30. Spring clip 28 assists in moving trap door 14 toward its closed position from its open position. Specifically, when trap door 14 is in its open position, trap door 14 via hinge 40 exerts a force on spring clip 28 such that spring clip 28 biases trap door 14 toward the closed position. Due to the taut connection between trap door 14 and second motorized roller 18 via ribbon 19, trap door 14 is held in its open position. Thus, when second motorized roller 18 is activated to rotate in a counterclockwise direction to relax the connection between trap door 14 and second motorized roller 18 by creating slack in ribbon 19, spring clip 28 pushes trap door 14 away from motor bracket 30 toward the closed position of trap door 14. Spring clip 28 therefore assists gravitational forces in moving trap door 14 toward closed position.

Second motorized roller 18 and ribbon 19 serve as a means for pivoting trap door 14 between open position and closed position. Activation of the pivoting means, rotation of second motorized roller 18 in one of its two opposing directions, causes trap door 14 to move toward open position. Deactivation of the pivoting means, rotation of second motorized roller 18 in the other of its two opposing directions, allows trap door 14 to be moved by gravitational forces toward closed position. It will be appreciated by those of skill in the art that other pivoting means may be utilized to effect the same result. For example, the second motorized roller of the embodiments discussed herein used to open and close the trap door could be substituted with a motorized roller which is only able to be powered in one prescribed direction about its longitudinal axis and which includes a bias means which biases the roller in the opposite direction upon rotation in that prescribed direction. With such a biased roller, rotation in the prescribed direction, activation of the pivoting means, would cause the trap door to move toward its open position and release of the roller. Deactivation of the pivoting means, would allow the ribbon to unwind and allow the trap door to be moved toward its closed position by gravitational forces.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrically actuated trap door system for a projection screen case having a bottom surface and defining an interior space, the system comprising:
   a trap door having first and second opposing edges, the first edge pivotally connected to the case such that the trap door is movable between a closed position in which the trap door is substantially flush with the bottom surface of the case and an open position in which the second edge of the trap door is disposed within the interior of the case;
   a motorized roller disposed within the case, the roller having a longitudinal axis and rotatable in first and second directions about its longitudinal axis; and
   a ribbon having first and second ends, the first end connected to the trap door and the second end connected to the motorized roller,
   such that when the trap door is in its closed position, rotation of the motorized roller in the first direction causes the ribbon to wrap around the roller thereby moving the trap door toward its open position and, when the trap door is in its open position, rotation of the motorized roller in the second direction allows the trap door to move toward its closed position by gravitational forces.

2. The system of claim 1, further comprising:
   bias means within the interior space of the case and positioned such that when the trap door is in the open position, the bias means biases the trap door toward the closed position.

3. The system of claim 2 wherein the bias means comprises a spring clip.

4. The system of claim 1, further comprising:
   a first limit switch disposed within the interior of the case and positioned such that the first limit switch is activated when the trap door reaches its open position, the first limit switch in electrical connection with the motorized roller such that activation of the first limit switch causes disconnection of power to the motorized roller.

5. The system of claim 4, further comprising:
   a second limit switch disposed within the interior of the case and positioned such that the second limit switch is activated when the trap door reaches its closed position, the second limit switch being electrically connected to the motorized roller such that activation of the second limit switch causes disconnection of power to the motorized roller.

6. The system of claim 1, further comprising:
   a reversible motor operatively connected to the motorized roller such that activation of the motor in one of its two directions causes the roller to rotate in the first direction, and activation of the motor in the other of its two directions causes the roller to rotate in the second direction.

7. An electrically actuated trap door system for a projection screen case having a bottom surface and defining an interior space, the system comprising:
   a trap door having first and second opposing edges, the first edge pivotally connected to the case such that the trap door is movable between a closed position in which the trap door is substantially flush with the bottom surface of the case and an open position in which the second edge of the trap door is disposed within the interior of the case;
   means for pivoting the trap door between its open and closed positions, the pivoting means disposed within the interior of the case and operatively connected to the trap door such that activation of the pivoting means causes the trap door to pivot about its first edge toward the trap door open position, and deactivation of the pivoting means allows the trap door to move by gravitational forces toward the closed position.

8. The system of claim 7 wherein the pivoting means comprises:
   a motorized roller having a longitudinal axis and rotatable about the longitudinal axis; and
   a ribbon having first and second ends, the first end connected to the trap door and the second end connected to the motorized roller,
   such that actuation of the motorized roller causes the ribbon to wrap around the roller thereby moving the trap door toward its open position, and deactivation of the motorized roller allows the ribbon to unwind from around the roller such that gravitational forces move the trap door toward its closed position.

9. The system of claim 7, further comprising:
   bias means within the interior space of the case and positioned such that when the trap door is in the open position, the bias means biases the trap door toward the closed position.

10. The system of claim 9 wherein the bias means comprises a spring clip.

11. The system of claim 8, further comprising:
    a first limit switch disposed within the interior of the case and positioned such that the first limit switch is activated when the trap door reaches its open position, the first limit switch in electrical connection with the motorized roller such that activation of the first limit switch causes disconnection of power to the motorized roller.

12. The system of claim 8, further comprising:

a limit switch disposed within the interior of the case and positioned such that the limit switch is activated when the trap door reaches its closed position, the limit switch being electrically connected to the motorized roller such that activation of the limit switch causes disconnection of power to the motorized roller.

13. The system of claim 8, further comprising:
a reversible motor operatively connected to the motorized roller such that activation of the motor in one of its two directions causes the roller to rotate in the first direction, and activation of the motor in the other of its two directions causes the roller to rotate in the second direction.

14. In a housing for a projection screen, the housing having a bottom surface and defining an interior space, the bottom surface including an opening through which the projection screen is movable between a retracted position within the housing and an extended position wherein the projection screen is substantially without the housing, an electrically actuated trap door system for the housing, comprising:
a trap door having first and second opposing edges, the first edge being pivotally connected to the housing such that the trap door is movable between a closed position in which the trap door is substantially flush with the bottom surface of the housing and covers the opening, and an open position in which the second edge of the trap door is disposed within the interior of the housing such that the opening is uncovered and the screen is movable therethrough;
a roller disposed within the housing, the roller having a longitudinal axis and rotatable in first and second directions about its longitudinal axis;
means interconnecting the roller and the trap door for translating the rotation of the roller into movement of the trap door between its closed position and its open position; and
a motor in electrical connection with the roller for rotating the roller in at least one of the first and second directions.

15. The trap door system of claim 14, wherein the interconnecting means comprises a ribbon having first and second ends, the first end connected to the trap door and the second end connected to the roller such that rotation of the roller in the first direction causes the ribbon to wind about the roller and rotation of the roller in the second direction causes the ribbon to unwind from the roller.

16. The trap door system of claim 14, wherein the motor comprises:
a reversible motor in electrical connection with the roller such that activation of the motor in one direction causes the roller to rotate in the first direction, and activation of the motor in the other direction causes the roller to rotate in the second direction.

17. The trap door system of claim 14, further comprising:
bias means within the interior space of the case and positioned such that when the trap door is in the open position, the bias means biases the trap door toward the closed position.

18. The system of claim 17 wherein the bias means comprises a spring clip.

19. The system of claim 14, further comprising:
a first limit switch disposed within the interior of the case and positioned such that the first limit switch is activated when the trap door reaches its open position, the first limit switch in electrical connection with the roller such that activation of the first limit switch causes disconnection of power to the roller.

20. The system of claim 14, further comprising:
a limit switch disposed within the interior of the case and positioned such that the limit switch is activated when the trap door reaches its closed position, the limit switch being electrically connected to the roller such that activation of the limit switch causes disconnection of power to the roller.

21. The system of claim 19, further comprising:
a second limit switch disposed within the interior of the case and positioned such that the second limit switch is activated when the trap door reaches its closed position, the second limit switch being electrically connected to the roller such that activation of the second limit switch causes disconnection of power to the roller.

* * * * *